UNITED STATES PATENT OFFICE.

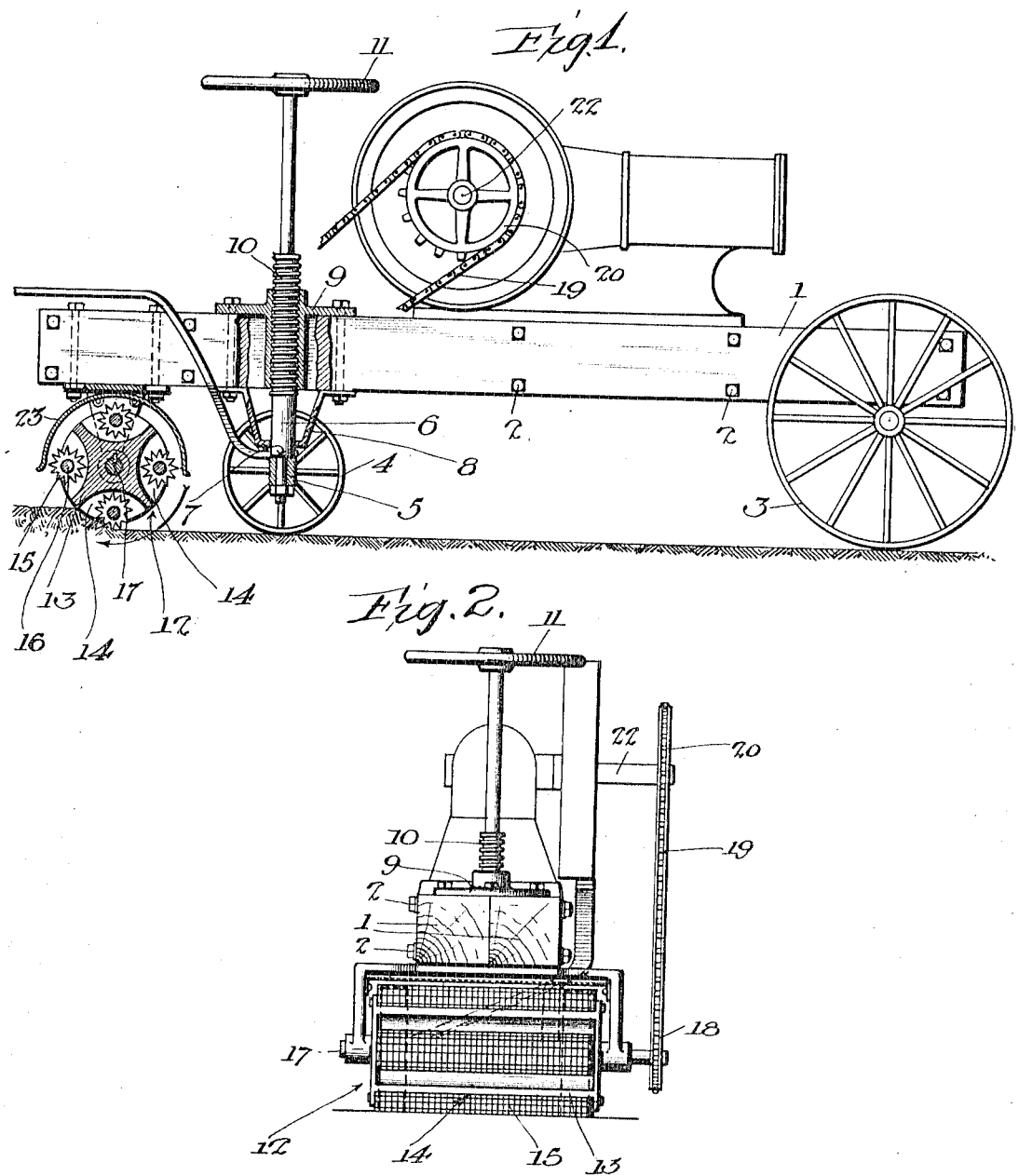

VLADIMIR V. MESSER, OF LOS ANGELES, CALIFORNIA, ASSIGNOR OF ONE-HALF TO A. F. GEORGE, OF LOS ANGELES, CALIFORNIA.

ROAD-SURFACING MACHINE.

1,084,810.   Specification of Letters Patent.   Patented Jan. 20, 1914.

Application filed August 12, 1912. Serial No. 714,731.

*To all whom it may concern:*

Be it known that I, VLADIMIR V. MESSER, a citizen of the United States, residing at Los Angeles, in the county of Los Angeles and State of California, have invented a new and useful Road-Surfacing Machine, of which the following is a specification.

The object of this machine is to cut the surface of a road down, to trim the surface to a uniform level and remove ruts, ridges and inequalities in the surface.

Referring to the drawings: Figure 1 is a side elevation of the machine, with the cutting element in section. Fig. 2 is a front elevation with the supporting wheels removed.

The machine comprises a frame consisting of two timbers 1, secured by tie-bolts 2, the rear end being supported by a pair of wheels 3, and the front end supported by a pair of wheels 4, mounted on front axle 5 which is pivotally connected to the king bolt 6, the latter being provided with a shoulder 7 which rests on the front axle 5. The king bolt 6 is guided by brackets 8 and 9. The bracket 9 is threaded and receives a threaded portion 10 of the king bolt, the latter having a hand-wheel 11 for turning it. By revolving the king bolt 6, the screw 10 may be moved up or down in threaded bracket 9 to adjust the end of the frame 1 the proper distance above the ground.

Mounted under the beams 1 is a rotary cutting element 12, comprising a drum 13 formed with pockets 14. Within the pockets 14 are star shaped cutters 15 which revolve on spindles 16. These cutters 15 are loose on their spindles and in the machine I have constructed, I employ about forty cutters on each spindle and rotate the drum 13 at about 1200 R. P. M. The drum 13 is keyed to a shaft 17 and carries a sprocket 18 which is connected by a chain 19 with a sprocket 20 on the shaft 22 of an engine which is mounted on frame 1.

When the drum end of the machine is raised, the engine is started and by then turning the hand-wheel 11, the drum 13 is brought down to the surface of the road until the cutting stars 15 barely touch the ground. Then the machine is moved along the road, either by horses or power and any projections on the road which come under the drum are disintegrated by the cutting stars 15, which revolve in a planetary manner, being carried bodily in a circle by the drum, and also revolving on their own spindles by contact with the surface which they are cutting. To protect the operator from the flying loose dirt, the drum 13 is covered with a shield 23.

What I claim is:

1. A road surfacing machine comprising a frame, a cutter mounted on said frame consisting of a rotatable member, spindles extending longitudinally of the rotatable member, star shaped cutters mounted on said spindles, means for rotating said rotatable member axially, means for moving said frame and rotatable member bodily along the roadway, and means for regulating the elevation of the rotatable member with respect to the roadway.

2. A road surfacing machine, comprising a frame, a cutter mounted on said frame, consisting of a rotatable member, spindles extending longitudinally of the rotatable member, star shaped cutters mounted on said spindles, means for driving said rotatable member, wheels supporting both ends of said frame, and means for adjusting the wheels adjacent the cutters vertically with respect to the frame, to regulate the cutting depth of the cutters in the roadbed.

3. In a road dressing machine, a cutting element comprising a drum with pockets and star shaped cutters in said pockets, mounted to freely rotate with respect to the drum, and means for rotating the drum and star shaped cutters bodily, the star shaped cutters being caused to axially rotate by their cutting action in the roadway, and means traveling along the roadway for maintaining said drum at a definite elevation with respect to the roadway.

4. A road surfacing machine, comprising a frame, a cutting element mounted on the frame, supporting wheels near the cutting element, a shaft for the supporting wheels, a threaded king bolt supported by said shaft, and a nut on the frame engaging the threaded portion of the king bolt for adjusting the elevation of the frame to regulate the cutting depth of the cutters in the road bed In testimony whereof, I have hereunto set my hand at Los Angeles, California this 16th day of July 1912.

VLADIMIR V. MESSER.

In presence of—
   Geo. F. Hackley,
   M. E. Blasdel.